(12) United States Patent
Righi et al.

(10) Patent No.: US 11,531,760 B1
(45) Date of Patent: Dec. 20, 2022

(54) BASEBOARD MANAGEMENT CONTROLLER (BMC)-BASED SECURITY PROCESSOR

(71) Applicant: AMERICAN MEGATRENDS INTERNATIONAL, LLC, Duluth, GA (US)

(72) Inventors: Stefano Righi, Lawrenceville, GA (US); Umasankar Mondal, Snellville, GA (US); Sanjoy Kumar Maity, Snellville, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 111 days.

(21) Appl. No.: 17/104,851

(22) Filed: Nov. 25, 2020

(51) Int. Cl.
*G06F 21/57* (2013.01)
*G06F 21/74* (2013.01)
*G06F 21/85* (2013.01)
*G06F 9/30* (2018.01)

(52) U.S. Cl.
CPC .............. *G06F 21/572* (2013.01); *G06F 9/30* (2013.01); *G06F 21/74* (2013.01); *G06F 21/85* (2013.01); *G06F 2221/033* (2013.01)

(58) Field of Classification Search
CPC ........ G06F 21/572; G06F 21/74; G06F 21/85; G06F 9/30; G06F 2221/033
See application file for complete search history.

(56) References Cited

U.S. PATENT DOCUMENTS

| 2019/0213359 A1* | 7/2019 | Kepa ................. G06F 21/73 |
| 2019/0220603 A1* | 7/2019 | Gopalakrishnan ...... G06F 21/64 |
| 2019/0236271 A1* | 8/2019 | Shivanna .............. G06F 21/575 |

OTHER PUBLICATIONS

Yigal Edery, et al. "A Case For a Trustworthy BMC", CSIS and OCP, Nov. 2020, 19 pages.

* cited by examiner

*Primary Examiner* — Henry Tsai
*Assistant Examiner* — John B Roche
(74) *Attorney, Agent, or Firm* — Newport IP, LLC; Leonard J. Hope

(57) ABSTRACT

Technologies are described herein for providing a Baseboard Management Controller ("BMC") -based security processor. The disclosed BMC-based security processor can provide a hardware Root of Trust ("RoT") for a computing platform without the addition of specialized silicon to the platform and while minimizing the number of attack points. The disclosed BMC-based security processor can also provide functionality for securely filtering requests made on certain buses in a computing platform. Through implementations of the features identified briefly above, and others described herein, various technical benefits can be achieved such as, but not limited to, increased security as compared to previous computing systems that utilize a BMC to provide a hardware RoT and reduced complexity and cost as compared to previous computing systems that utilize a separate hardware device, such as a Field Programmable Gate Array ("FPGA") or a microcontroller, to provide a hardware RoT.

20 Claims, 7 Drawing Sheets

BASEBOARD MANAGEMENT CONTROLLER (BMC)-BASED SECURITY PROCESSOR

BACKGROUND

The security of computing system platforms is commonly based on ensuring that platform firmware is not tampered with, such that only the original firmware code from the platform manufacturer will be executed when a platform is powered on. Verification of the originality of platform firmware is typically performed using public key cryptography: platform firmware is signed with a private key that is kept secret by the manufacturer of the firmware and the originality of the firmware is verified each time the platform is powered on making use of a public key that is fused in a one-time programmable memory. In a system such as this, the public key constitutes a hardware Root of Trust ("RoT"), which might be referred to herein as a "HRoT", and is the start of a chain of trust that leads to the creation of a secure execution environment for an operating system and other applications executing on the platform.

In some platforms, the hardware RoT is provided by specialized silicon, a field programmable gate array ("FPGA"), a microcontroller, or another type of hardware device. The addition of hardware to a computing system platform in this manner, however, increases both the cost and complexity of the platform.

In other platforms, a baseboard management controller ("BMC") is used to provide the hardware RoT. A BMC is a specialized service processor that monitors the physical state of a computer using sensors and provides management information for use by a system administrator through an out-of-band network. BMCs, however, are highly complex devices that typically perform a significant number of functions. As a result, BMCs can expose a large number of attack points to attackers that might be used to subvert the security of the HRoT and force the execution of malicious program code on a computing system platform.

It is with respect to these and other considerations that the disclosure made herein is presented.

SUMMARY

Technologies are described herein for providing a BMC-based security processor. The disclosed BMC-based security processor can provide a HRoT without the addition of specialized silicon to a platform and while minimizing the number of attack points. The disclosed BMC-based security processor can also provide functionality for securely filtering requests made on certain buses in a computing platform.

Through implementations of the features identified briefly above, and others described herein, various technical benefits can be achieved such as, but not limited to, increased security as compared to previous computing systems that utilize a BMC to provide a HRoT, and reduced complexity and cost as compared to previous computing systems that utilize a separate hardware device, such as an FPGA or a microcontroller, to provide a HRoT. Technical benefits other than those specifically mentioned herein can also be realized through an implementation of the disclosed technologies.

BMC-Based Security Processor Hardware RoT

As described briefly above, in one embodiment disclosed herein a BMC-based security processor is configured to provide a HRoT for a computing platform. In this embodiment, a computing system platform includes a BMC system on chip ("SOC"). The BMC SOC can provide conventional BMC functionality including, but not limited to, monitoring various aspects of the operational state of a computing platform using sensors, and communicating data describing the operational state of the computing platform to a management system through an out-of-band ("OOB") network. Additional examples of the various types of management functionality that can be provided by the BMC SOC will be provided below.

In order to provide a HRoT, the BMC SOC is configured with a memory storing a public key. In one embodiment, the public key stored in the memory is immutable and cannot be changed one it has been programmed. As will be described in greater detail below, the BMC SOC can utilize the public key to cryptographically verify a firmware for the BMC SOC prior to execution. The firmware is signed with a private key corresponding to the public key stored in the memory of the BMC SOC.

As will also be described in greater detail below, the firmware for the BMC SOC includes a security subsystem and a management subsystem. The management subsystem performs traditional BMC functionality, such as that described above. The security subsystem provides a HRoT based on the public key and, potentially, other types of security functionality, such as functionality for filtering requests made on certain buses of a platform.

In order to provide the disclosed functionality, the BMC SOC also includes a first processor and a second processor in one embodiment. The first processor and the second processor might each include one or more processor cores. In one specific embodiment, for example, the first processor includes two processor cores, and the second processor includes a single processor core.

The processor cores can be of the same or different types and can execute in different modes, or "environments." For instance, the cores might provide a secure execution environment (which might be referred to as a "secure environment" or a "secure mode") or a normal execution environment (which might also be referred to herein as a "normal environment" or a "normal mode"). In one specific example, the cores of the first processor can execute in the normal mode or the secure mode and the cores of the second processor can execute in the normal mode or the secure mode independently of the cores of the first processor. Switching between the modes can be initiated by several triggers but, in any case, code executing in the normal environment cannot access the secure environment and therefore cannot change what is executed in that mode. In this regard, it is to be appreciated that the processors can be physically different or logically separated based on the execution state of the processor in the normal or secure mode.

Upon powering on the first processor, the first processor attempts to cryptographically verify a firmware for the BMC SOC using the public key stored in the memory. As discussed above, the BMC SOC firmware includes a security subsystem configured to provide a HRoT based upon the public key and a management subsystem configured to provide BMC functionality.

If the first processor is able to cryptographically verify the firmware for the BMC SOC, the first processor begins executing the security subsystem in the secure environment. Additionally, the first processor causes the second processor to exit from reset and to begin executing the management subsystem in the normal environment.

The security subsystem, in turn, attempts to cryptographically verify a firmware for a host computer containing the BMC SOC. If the security subsystem can cryptographically verify the firmware for the host computer, the security subsystem causes a host processor of the host computer to exit from reset and begin executing the firmware for the host computer.

If the first processor cannot cryptographically verify the firmware for the BMC SOC, the first processor will recover the firmware for the BMC SOC. For example, the first processor might retrieve a valid copy of the firmware for the BMC SOC and store the firmware in a memory of the host computer. In a similar fashion, the first processor can recover the firmware for the host computer if it is unable to cryptographically verify the firmware for the host computer.

BMC-Based Security Processor Bus Filtering

As described briefly above, the BMC-based security processor disclosed herein can also provide functionality for securely filtering requests made on certain buses in a computing platform. In one embodiment, for example, a BMC SOC is configured in the manner described above with one processor executing a management subsystem in a normal environment to provide BMC functionality for a host computer. The BMC SOC also includes another processor executing a security subsystem in a secure environment.

A bus of the host computer and a device of the host computer are assigned to the secure environment. For example, and without limitation, the bus might be an enhanced serial peripheral interface ("ESPI") bus and the device might be a serial peripheral interface ("SPI") memory device. The memory device might store a firmware for the BMC SOC and/or a firmware for the host computer.

The security subsystem executing on the processor operating in the secure environment is configured to receive requests on the bus to perform operations on the device. For instance, the security subsystem might intercept read or write requests directed to a memory device. In response thereto, the security subsystem can determine if the requests are valid. If a request is valid, the security subsystem can pass the request to the destination device. In this way, for example, requests to read from a memory device can be passed to the device without modification.

If a request is not valid, however, the request will not be passed to the device and an error will be returned in response to the request. In this way, for example, requests to write to a memory device that are not valid (e.g. malicious requests) can be filtered. Other types of requests received on other types of buses for other types of devices can be filtered by a processor of a BMC SOC in a similar fashion.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
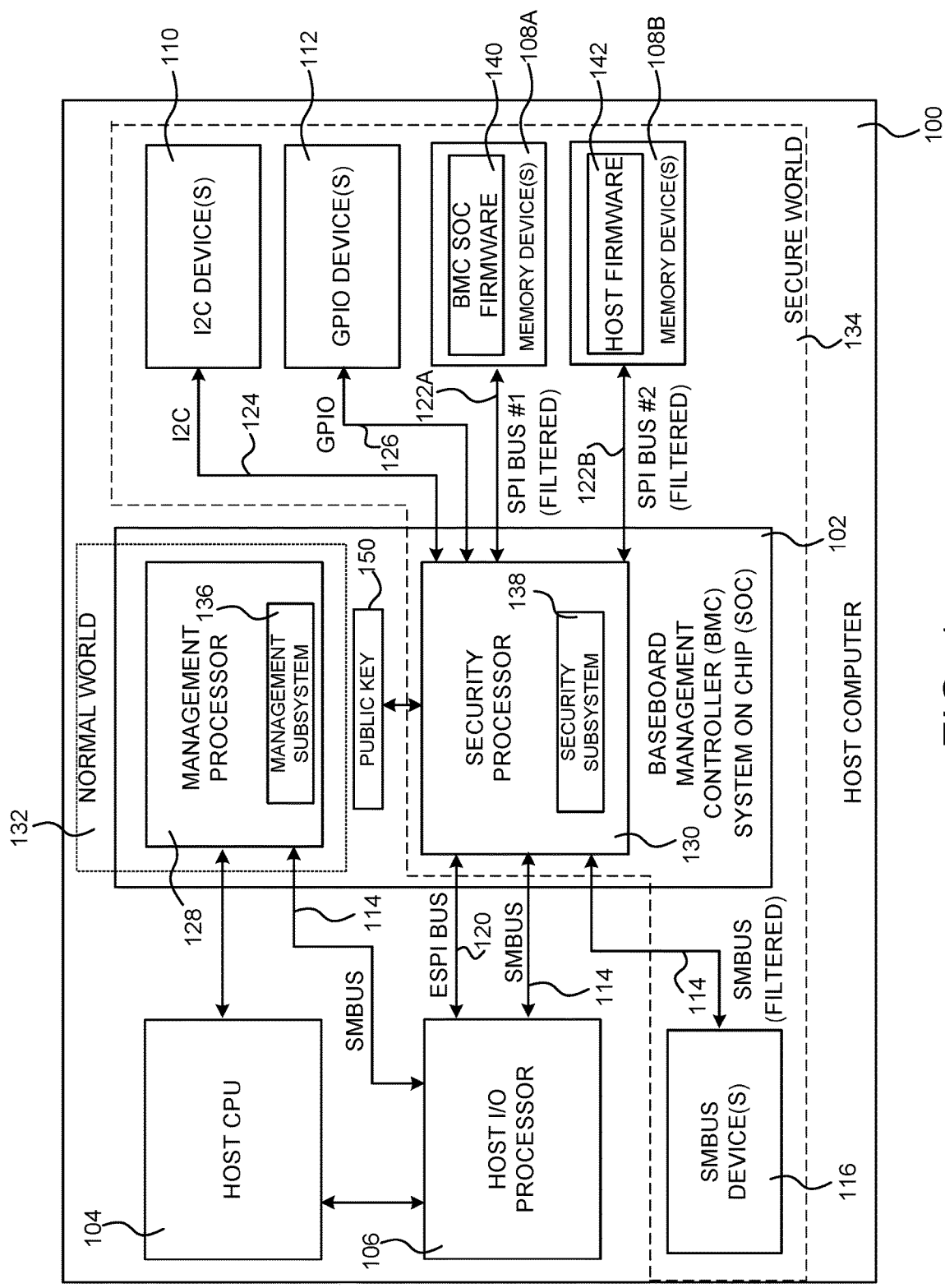
FIGS. 1 and 2 are computing system diagrams illustrating aspects of the configuration of a host computer that includes a BMC SOC configured with a security processor, according to one or more embodiments presented herein.

Technologies are described herein for providing a BMC-based security processor. The disclosed BMC-based security processor can provide a HRoT without the addition of specialized silicon to a platform and while minimizing the number of attack points. The disclosed BMC-based security processor can also provide functionality for securely filtering requests made on certain buses in a computing platform.

Through implementations of the features identified briefly above, and others described herein, various technical benefits can be achieved such as, but not limited to, increased security as compared to previous computing systems that utilize a BMC to provide a HRoT, and reduced complexity and cost as compared to previous computing systems that utilize a separate hardware device, such as an FPGA or a microcontroller, to provide a HRoT. Technical benefits other than those specifically mentioned herein can also be realized through an implementation of the disclosed technologies. Additional details regarding these aspects will be provided below with regard to FIGS. 1-7.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

BMC-Based Security Processor Hardware RoT

Figure 2:
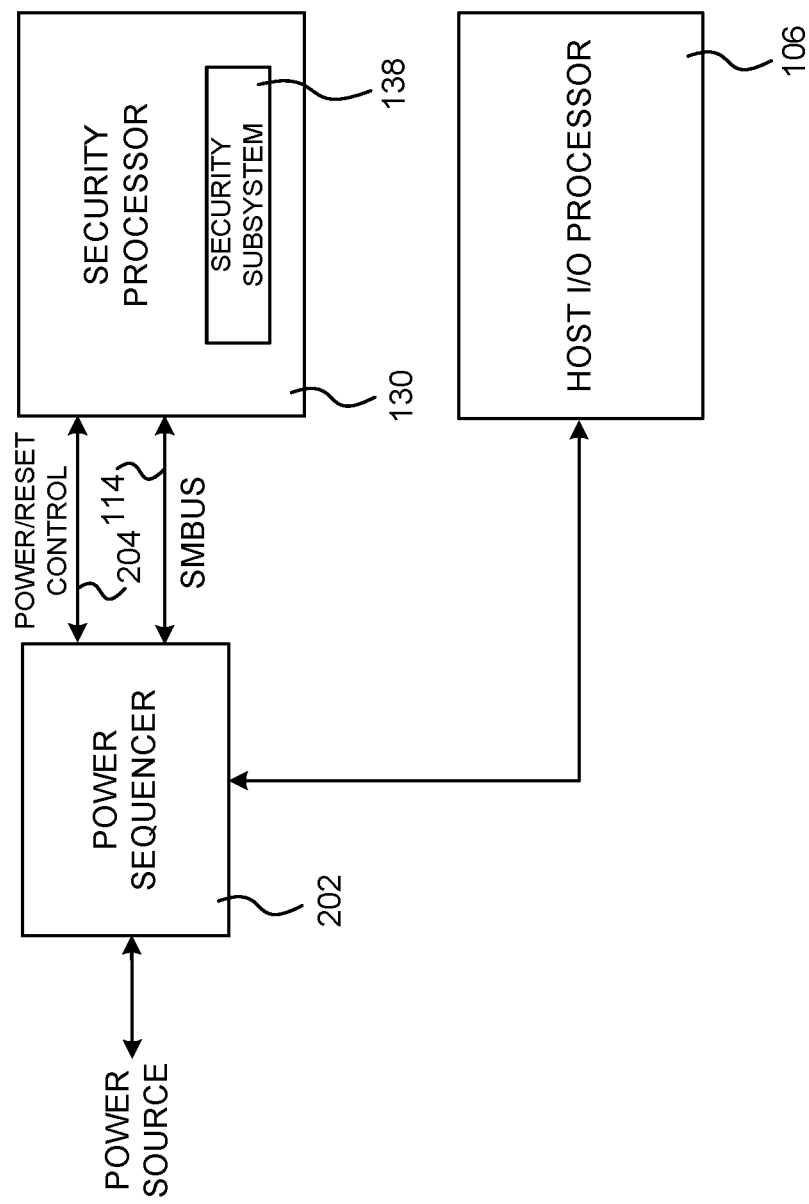

FIGS. 1 and 2 are computing system diagrams illustrating aspects of the configuration of a host computer 100 that includes a BMC SOC 102, according to one or more embodiments presented herein. The host computer 100 might be implemented as a server computer, for example, with one or more host central processing units ("CPUs") 104. A host CPU 104 might include one or more processor cores.

According to various embodiments, the host CPU 104 might be a CPU from INTEL CORPORATION or ADVANCED MICRO DEVICES, INC. ("AMD"), a CPU based upon an architecture from ARM, LTD., or another type of CPU. The host CPU 104 might communicate with other components in the host computer 100 directly or by way of a host input/output ("I/O") processor 106. In a host computer 100 utilizing an INTEL-based architecture, for example, the host I/O processor 106 can be implemented as a Platform Controller Hub ("PCH"). Other types of host I/O processors 106 can be used with other types of CPU architectures. The host computer 100 can include many other components, some of which are described below with regard to FIGS. 1 and 7.

As shown in FIG. 1, the BMC SOC 102 also includes a first processor 130 (which might be referred to herein as the "security processor 130") and a second processor 128 (which might be referred to herein as the "management processor 128"). The security processor 130 and the management processor 128 might each include one or more processor cores. In this regard, it is to be appreciated that although two separate processors are illustrated in FIG. 1 and described herein, the disclosed functionality can be provided by a single processor working in two different modes of operation (i.e. the normal and secure modes described herein).

As will be described in greater detail below, the BMC SOC 102 can provide BMC functionality including, but not limited to, monitoring various aspects of the operational state of a computing platform like the host computer 100 using sensors, and communicating data describing the operational state of the computing platform to a management system through an 00B network. Additional examples of the various types of management functionality that can be provided by the BMC SOC 102 will be provided below.

In one specific embodiment, the BMC SOC 102 is the ASPEED 2600 from ASPEED TECHNOLOGY, INC. In this embodiment, the management processor 128 includes two ARM CORTEX A7 processor cores and the security processor 130 includes one ARM CORTEX M3 processor core. Other types, numbers, and configurations of processors and processor cores can be utilized in other embodiments.

As known to those skilled in the art, the ARM CORTEX A7 and CORTEX M3 processor cores support ARM TRUSTZONE technology. ARM TRUSTZONE is a system-wide approach to embedded security for ARM CORTEX-based processor systems. ARM TRUSTZONE creates two execution environments that can run simultaneously on a single core: a secure environment 134 (which might also be referred to herein as a "secure world" or "secure mode") and a normal environment 132 (which might be referred to herein as a "normal world," a "normal mode," a "not-as-secure world," or a "non-secure world"). The secure world 134 is represented in FIG. 1 by a dashed line while the normal world 132 is represented by a dotted line.

ARM CORTEX processors with TRUSTZONE run a secure operating system ("OS") and a normal OS simultaneously from a single core. TRUSTZONE can secure a software library or an entire OS to run in the secure world 134. Non-secure software is blocked from access to the secure world 134 and resources assigned thereto. TRUSTZONE is based on the principle of least privilege, which means that system modules like drivers and applications do not have access to a resource unless necessary.

Using TRUSTZONE, software runs in the secure world 134 or the normal world 132. Work that must transpire between the secure world 134 and the normal world 132 takes place via software called the "core logic" (COREX-M processors) or the "secure monitor" (CORTEX-A processors). The concept of secure and normal worlds extends beyond the processor to encompass memory, software, bus transactions, interrupts, and peripherals within a SOC, such as the BMC SOC 102. By creating a security subsystem, assets can be protected from software attacks and common hardware attacks.

As shown in FIG. 1, the BMC SOC 102 can execute a BMC SOC firmware 140. In one embodiment, the BMC SOC firmware 140 is based upon the LINUX operating system. In this regard, however, it is to be appreciated that other suitable operating systems might be utilized in other configurations.

In order to provide aspects of the functionality disclosed herein, various resources within the host computer 100 can be assigned to the secure world provided by the processor 130. In the example shown in FIG. 1, for instance, the following resources have been assigned to the secure world: system management bus ("SMBUS") devices 116 connected to the processor 130 by way of the SMBUS 114; I²C devices 110 and I²C bus 124; general purpose I/O ("GPIO") devices 112 and GPIO bus 126; serial peripheral interface ("SPI") memory device 108A, which is connected by way of the SPI bus 122A and which stores a firmware 140 for the BMC SOC 102; SPI memory device 108B, which is connected by way of the SPI bus 122B and which stores a firmware 142 for the host computer 100; SPI bus 122A; and SPI bus 122B. Other resources within the host computer 100 can also be assigned to the secure world 134 provided by the processor 130 in a similar fashion such as, for example, controllers, which control the busses to which the devices are connected. As will be described in greater detail below, the management processor 128 can only access the resources assigned to the secure world 134, such as the memory devices 108A and 108B, by making requests to the security processor 130.

In order to provide a HRoT, the BMC SOC is configured with a memory storing a public key 150. The public key 150 stored in the memory is immutable and cannot be changed. As will be described in greater detail below, the BMC SOC 102 can utilize the public key 150 to cryptographically verify the BMC SOC firmware 140 prior to execution. As mentioned briefly above, the BMC SOC firmware 140 is signed with a private key corresponding to the public key 150 stored in the memory of the BMC SOC 102.

As also mentioned briefly above, the BMC SOC firmware 140 includes a security subsystem 138 and a management subsystem 136. The management subsystem 136 executes on the management processor 128 in the normal world 132 and performs traditional BMC functionality, such as that described above. The security subsystem 138 executes on the security processor 130 in the secure world and provides a HRoT based on the public key 150. The security subsystem 138 can also provide other types of security functionality, such as functionality for filtering requests made on certain buses, such as the SMBUS 114 and the Enhanced Serial Peripheral Interface ("ESPI") bus 120. Additional details regarding this functionality are provided below with regard to FIG. 5.

In one embodiment, when the security processor 130 is powered on, it attempts to cryptographically verify the BMC SOC firmware 140 using the public key 150. If the security processor 130 is able to cryptographically verify the BMC SOC firmware 140, the security processor 130 begins executing the security subsystem 138 in the secure world 134. Additionally, the security processor 130 causes the management processor 128 to exit from reset and to begin executing the management subsystem 136 in the normal world 132.

Upon execution, the security subsystem attempts to cryptographically verify the host firmware 142 using the public key 150. If the security subsystem 138 can cryptographically verify the firmware 142 for the host computer 100, the security subsystem 138 causes the host CPU 104 to exit from reset and begin executing the host firmware 142.

If the security processor 130 cannot cryptographically verify the firmware 140 for the BMC SOC 102, the security processor 130 will recover the firmware 140 for the BMC SOC 102. For example, the security processor 130 might retrieve a valid copy of the firmware 140 for the BMC SOC 120 and store the firmware 140 in the memory device 108A. In a similar fashion, the security processor 130 can recover the firmware 142 for the host computer 100 and store the recovered firmware in the memory 108B if it is unable to cryptographically verify the host firmware 142. Additional details regarding these processes will be provided below with regard to FIG. 4.

FIG. 2 is a computing system diagram illustrating additional aspects of the configuration of the host computer 100, according to one or more embodiments presented herein. As shown in FIG. 2, a power sequencer 202 can be interposed between a power source and the security processor 130 and host I/O processor 106. The power sequencer 202 is implemented as a complex programmable logic device ("CPLD") in some embodiments. As known to those skilled in the art, the power sequencer 202 provides functionality for applying the proper voltage to the hardware components of the host computer 100 at the proper time and in the proper order.

Communication can be enabled between the power sequencer 202 and the security processor 130 by way of the SMBUS 114 and a power/reset control line 204. These connections enable the security processor 130 to communicate with the power sequencer 202 and provide instructions to the power sequencer 202. For example, and as discussed briefly above, the security processor 130 might instruct the power sequencer 202 to enable the management processor 128 or the host CPU 104 to exit from reset. In some embodiments, an authentication application programming interface ("API") is provided between the power sequencer 202 and the security processor 130. Other mechanisms for controlling the power status of hardware components in the host computer 100 can be provided in other configurations.

Figure 3:
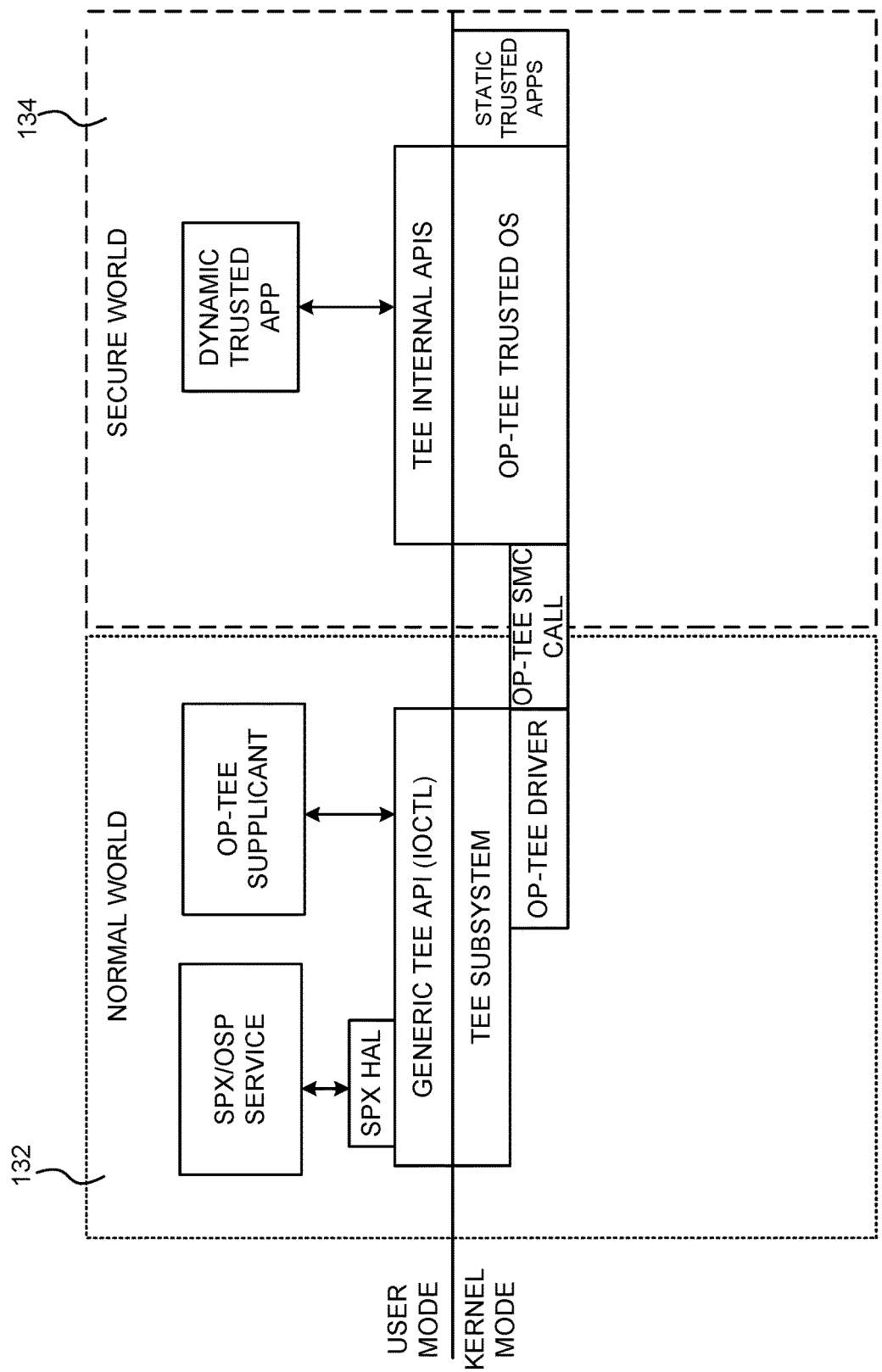
FIG. 3 is a software architecture diagram showing aspects of one mechanism for enabling a management processor in a BMC SOC to securely access memory devices of a host computer, in one example described herein.

FIG. 3 is a software architecture diagram showing aspects of a mechanism for enabling a management processor 128 in a BMC SOC 102 to securely access memory devices 108 of a host computer 100, in one example described herein. In particular, the mechanism illustrated in FIG. 3 enables existing program code for performing BMC-related functions that executes on the management processor 128 in the normal world 132 to access physical devices assigned to the secure world 134.

In order to provide this functionality, program code is divided into two portions: one portion that performs the BMC-related management functionality and another portion that performs the actual access of the physical device (e.g. the memory devices 108A and 108B). The portion that performs the BMC-related functionality continues to execute on the management processor 128 while the portion that performs the access of the physical device executes on the security processor 130. The mechanism shown in FIG. 3 enables this functionality and is commonly referred to as an Open Portable Trusted Execution Environment ("OP-TEE"). Additional details regarding the configuration and operation of OP-TEE are known to those skilled in the art.

Figure 4:
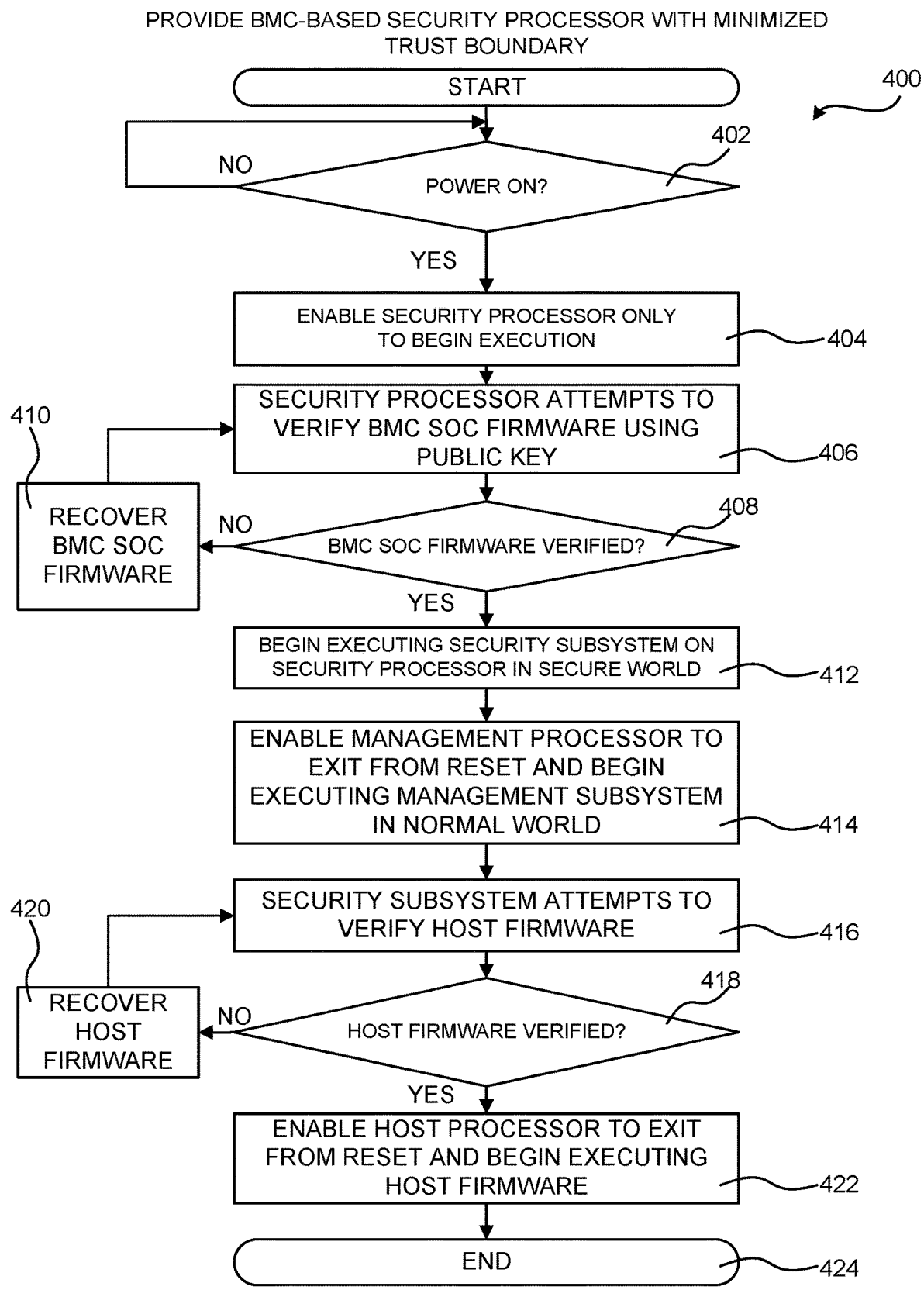
FIG. 4 is a flow diagram illustrating aspects of a routine for providing a BMC-based security processor, according to one or more embodiments presented herein.

FIG. 4 is a flow diagram illustrating aspects of a routine 400 for providing a BMC-based security processor 130, according to one or more embodiments presented herein. It is to be appreciated that the logical operations described herein with respect to FIG. 4, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 400 begins at operation 402, where the power sequencer 202 determines whether the host computer 100 has been powered on. If so, the routine 400 proceeds from operation 402 to operation 404, where the power sequencer 202 enables the security processor 130 to begin executing. The routine 400 then proceeds from operation 404 to operation 406, where the security processor 130 attempts to cryptographically verify the BMC SOC firmware 140 using the public key 150 stored in the memory of the BMC SOC 102.

If the security processor 130 cannot cryptographically verify the BMC SOC firmware 140, the routine 400 proceeds from operation 408 to operation 410, where the security processor 130 can recover the BMC SOC firmware 140 such as, for example, retrieving a new firmware 140 and updating the contents of the memory 108A. The routine 400 then proceeds from operation 410 back to operation 406, where another attempt can be made to cryptographically verify the BMC SOC firmware 140.

If the security processor 130 is able to cryptographically verify the BMC SOC firmware 140, the routine 400 proceeds from operation 408 to operation 412, where the security processor 130 begins executing the security subsystem 138 in the secure world 134. The routine 400 then proceeds from operation 412 to operation 414, where the security processor 130 enables the management processor 128 to exit from reset and begin executing the management subsystem 136 in the normal world 132.

From operation 414, the routine 400 proceeds to operation 416, where the security subsystem 138 executing on the security processor 130 in the secure world 134 attempts to cryptographically verify the host firmware 142 using the public key 150 stored in the memory of the BMC SOC 102. In this regard, it is to be appreciated that the public key 150 might be stored in other locations, such as on a SPI device, so long as the data structure including it can be verified by a public key stored in a previously-verified area. In some embodiments, the key fused into the memory of the BMC SOC 102 can be used to verify a small loader program and public keys used to verify the BMC SOC firmware 140 and the host firmware 142. Other implementations can also be utilized.

If the security processor 130 cannot cryptographically verify the host firmware 142, the routine 400 proceeds from operation 418 to operation 420, where the security processor 130 can recover the host firmware 142 such as, for example, retrieving a new host firmware 142 and updating the contents of the memory 108B. The routine 400 then proceeds from operation 420 to operation 416, where another attempt is made to cryptographically verify the host firmware 142.

If the security processor 130 is able to cryptographically verify the host firmware 142, the routine 400 proceeds from operation 418 to operation 422, where the security processor 130 enables the host processor 104 to exit from reset and to begin executing the host firmware 142. The routine 400 then proceeds from operation 422 to operation 424, where the routine 400 ends.

BMC-Based Security Processor Bus Filtering

As described briefly above, the BMC-based security processor 130 disclosed herein can also provide functionality for securely filtering requests made on certain buses in a host computer 100. In one embodiment, for example, a BMC SOC 102 is configured in the manner described above with one processor 128 executing a management subsystem 136 in a normal world 132 to provide BMC functionality for a host computer 100. As in the example shown in FIG. 1 and discussed above, the BMC SOC 102 also includes another processor 130 executing a security subsystem 138 in a secure world 134.

As also described above, various resources within the host computer 100 can be assigned to the secure world 134. For instance, buses of the host computer 100 and devices of the host computer 100 can be assigned to the secure environment. For example, and without limitation, the ESPI, SPI, SMBUS, I²C, and GPIO buses of the host computer 100 may be assigned to the secure world 134 in different embodiments. Similarly, the I²C, GPIO, and SPI memory devices 108A and 108B might be assigned to the secure world 134. As discussed above, the memory devices 108A and 108B might store a firmware 140 for the BMC SOC and/or a firmware 142 for the host computer 100, respectively.

The security subsystem 138 executing on the security processor 130 is configured to receive requests on the buses assigned to the secure world 134 and to perform operations on the devices assigned to the secure world. For instance, the security subsystem 130 might intercept read or write requests directed to the SPI memory devices 108A and 108B, to the GPIO devices 112, or to the I²C devices 110. As specific examples, the security processor 130 might receive requests on the ESPI bus 120 directed to an I²C device 110 or a SPI device such as the memory devices 108A and 108B, requests on the SMBUS 114 directed to an SMBUS device 116, or requests on the SMBUS 114 that are directed to a GPIO device 112.

In response receiving a request on a bus assigned to the secure world 134 or directed to a device assigned to the secure world 134, the security subsystem 138 can determine if the request is valid. If a request is valid, the security subsystem 138 can pass the request to the target, or destination, device. In this way, for example, requests to read from a memory device such as the memory devices 108A and 108B can be passed to the device without interference.

If the security subsystem 138 determines that request is not valid (e.g. a malicious request to write to the firmware 140 or the firmware 142), however, the security subsystem 138 will not pass the request to the device and instead will return an error in response to the request. In this way, for example, requests to write to a memory device that are not valid can be filtered. Other types of requests received on other types of buses for other types of devices can be filtered by a processor of a BMC SOC 102 in a similar fashion.

Figure 5:
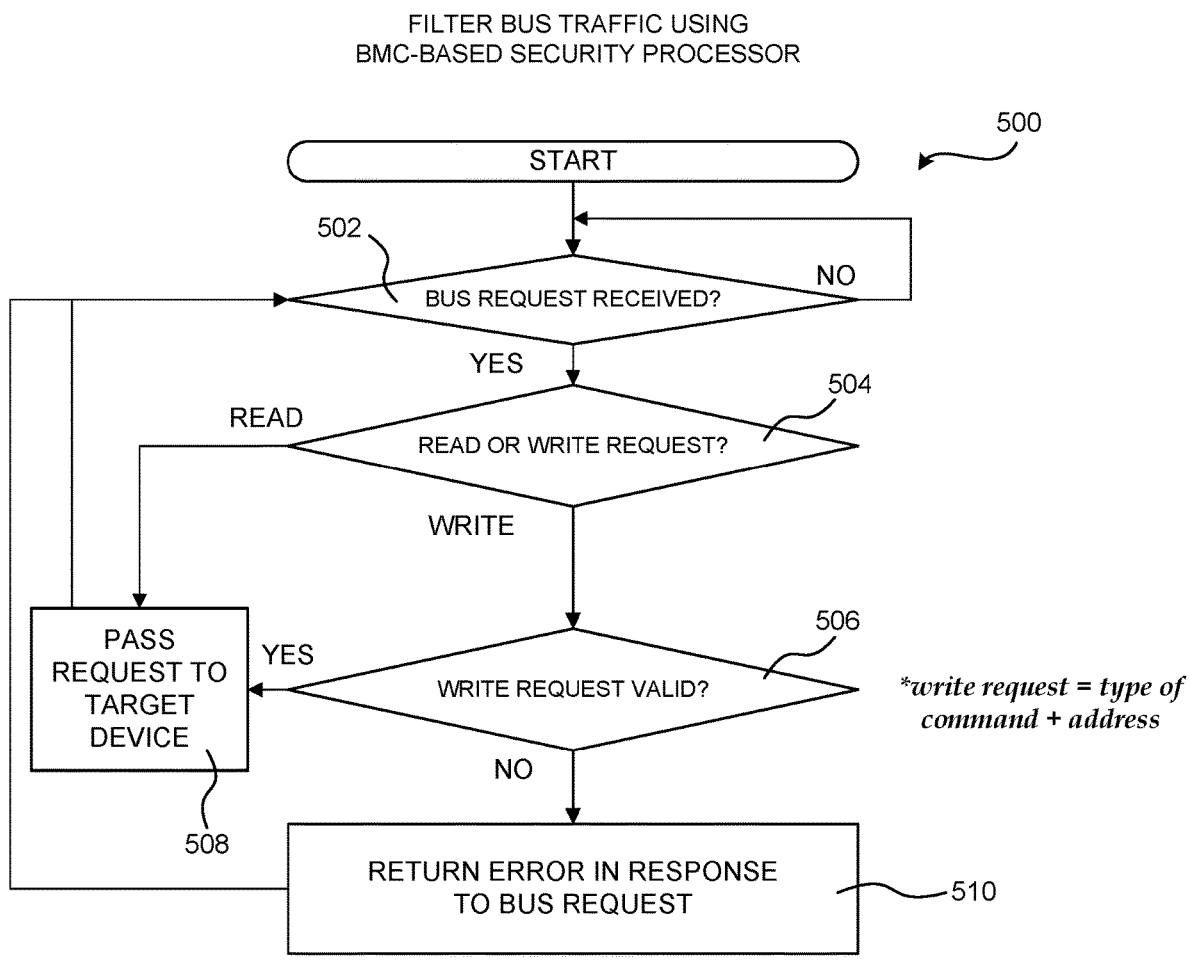
FIG. 5 is a flow diagram illustrating aspects of a routine for filtering bus traffic using a BMC-based security processor, according to one or more embodiments presented herein.

FIG. 5 is a flow diagram illustrating aspects of a routine 500 for filtering bus traffic using a BMC-based security processor 130, according to one or more embodiments presented herein. The routine 500 begins at operation 502, where the security subsystem 138 determines if a request (i.e. a read or write request) has been received for a bus that has been assigned to the secure world. If such a request is received, the routine 500 proceeds from operation 502 to operation 504, where the security subsystem 138 determines whether the received request is a read request or a write request.

If, at operation 504, the security subsystem 138 determines that the request is a read request, the routine 504 proceeds to operation 508, where the security subsystem 138 passes the request received at operation 502 to the target device (e.g. a memory device 108A or 108B). In some embodiments, the security subsystem 138 determines whether the read request is valid before passing the request to the target device. For example, too many read requests within a predetermined period of time might be indicative of a denial of service attack. In this case, a read request might be blocked and not passed to the target device. From operation 508, the routine 500 then proceeds back to operation 502, where another request can be processed in a similar manner.

If, at operation 504, the security subsystem 138 determines that the request is a write request, the routine 500 proceeds from operation 504 to operation 506. At operation 506, the security subsystem 138 determines if the write request is valid. Various attributes of a write request may be utilized to determine if the write request is valid. For example, and without limitation, a write request might be permitted only on specific address ranges of a device or to specific addresses on an I²C or SMBUS. Certain devices might also be allowed to be programmed with values in a certain range. Other attributes can be utilized in other embodiments.

If the request is valid, the routine 500 proceeds from operation 506 to operation 508, described above. If, however, the request is not valid, the routine 500 proceeds from operation 506 to operation 510, where the security subsystem 138 returns an error message in response to the request. The routine 500 then proceeds from operation 510 back to operation 502, where additional requests can be processed in a similar fashion.

Figure 6:
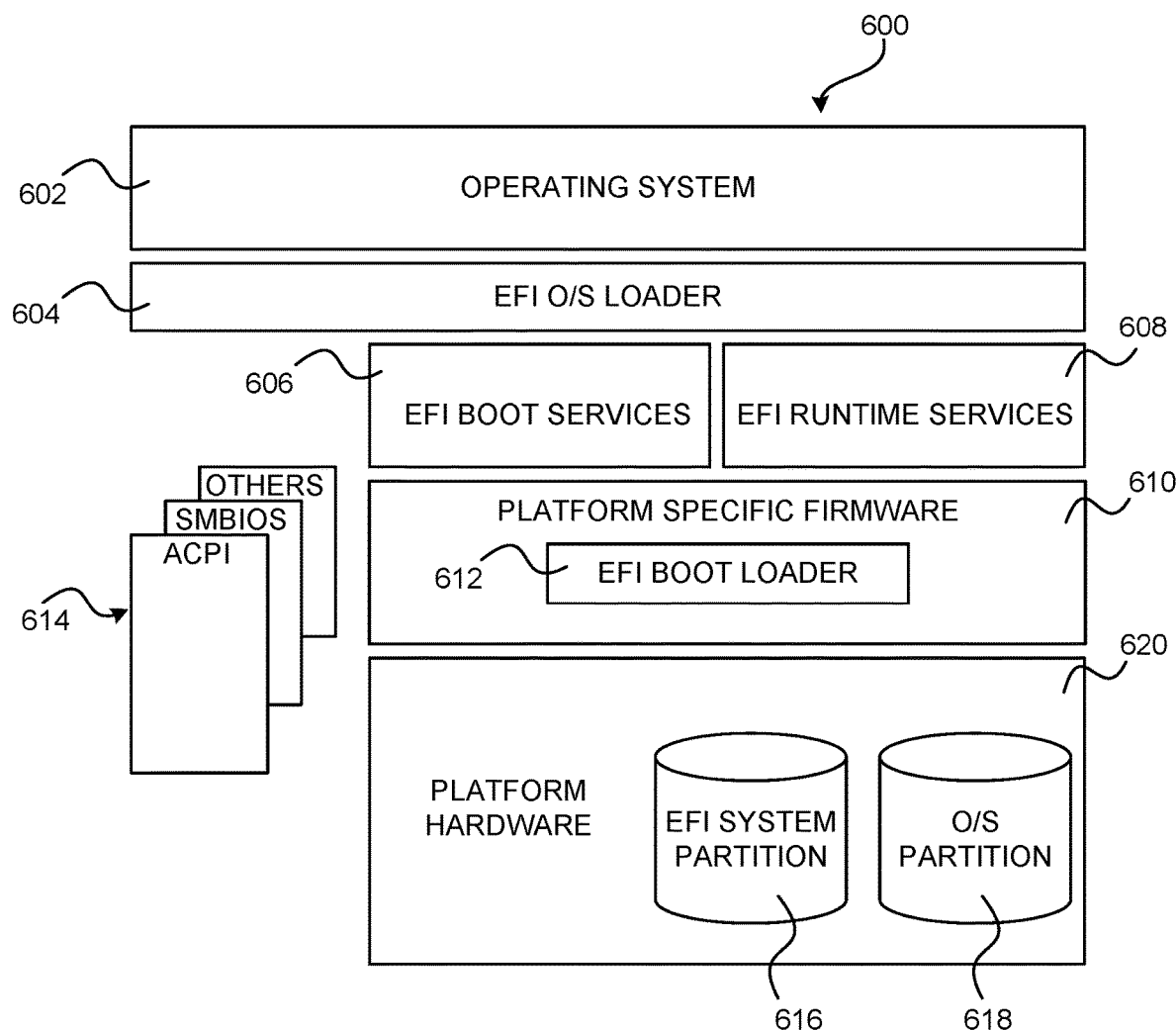
FIG. 6 is a software architecture diagram illustrating a software architecture for a unified extensible firmware interface ("UEFI") -compliant firmware that provides an operating environment for aspects of the technologies presented herein in one embodiment.

Turning now to FIG. 6, a software architecture diagram will be described that illustrates an architecture for a Unified Extensible Firmware Interface ("UEFI") Specification-compliant firmware 600 that can be configured to provide and/or utilize aspects of the technologies disclosed herein. In particular, the firmware architecture shown in FIG. 6 can be utilized to implement the host firmware 142 described above. The host firmware 142 can also be implemented in other ways in other configurations.

The UEFI Specification describes an interface between an operating system 602 and a UEFI Specification-compliant firmware 600. The UEFI Specification also defines an interface that a firmware 600 can implement, and an interface that an operating system 602 (which might be referred to herein as an "OS") can use while booting. How a firmware implements the interface can be left up to the manufacturer of the firmware. The UEFI Specification also defines a way for an operating system 602 and a firmware 600 to exchange information necessary to support the operating system boot process. The term "UEFI Specification" used herein refers to both the EFI Specification developed by INTEL CORPORATION and the UEFI Specification managed by the UEFI FORUM.

As shown in FIG. 6, the architecture can include platform hardware 620, such as that described below with regard to FIG. 7, and an operating system 602. A boot loader 612 for the operating system 602 can be retrieved from the UEFI system partition 616 using a UEFI operating system loader 604. The UEFI system partition 616 can be an architecturally shareable system partition. As such, the UEFI system partition 616 can define a partition and file system designed to support safe sharing of mass storage between multiple vendors. An OS partition 618 can also be utilized.

Once started, the UEFI OS loader 604 can continue to boot the complete operating system 602. In doing so, the UEFI OS loader 604 can use UEFI boot services 606, an interface to other supported specifications to survey, comprehend, and initialize the various platform components and the operating system software that manages them. Thus, interfaces 614 from other specifications can also be present on the system. For example, the ACPI and the System Management BIOS ("SMBIOS") specifications can be supported.

UEFI boot services 606 can provide interfaces for devices and system functionality used during boot time. UEFI runtime services 608 can also be available to the UEFI OS loader 604 during the boot phase. UEFI allows extension of platform specific firmware 610 by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 602 and system firmware 600, the Framework is a group of specifications that together describe a firmware implementation that has been designed to perform the full range of operations that are required to initialize a platform from power on through transfer of control to the operating system 602. The specifications that make up the Framework, which are also available from INTEL CORPORATION, are also expressly incorporated herein by reference.

Figure 7:
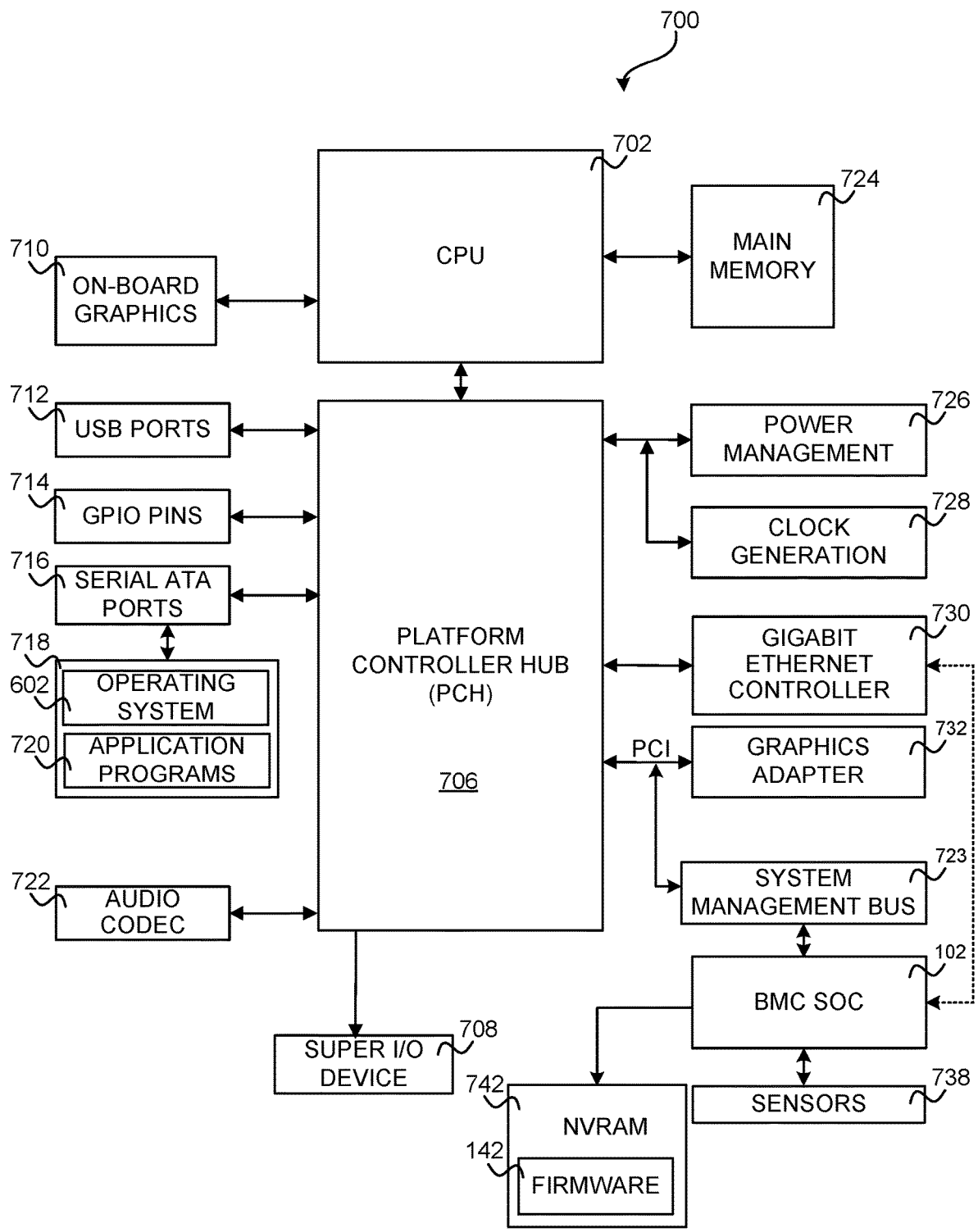
FIG. 7 is a computer architecture diagram that shows an illustrative architecture for a computer that can implement the technologies disclosed herein.

Referring now to FIG. 7, a computer architecture diagram that shows an illustrative architecture for a computer that can provide an operating environment for the technologies presented herein will be described. For example, and without limitation, the computer architecture shown in FIG. 7 can be utilized to implement the host computer 100 and/or any of the other computing systems disclosed herein.

FIG. 7 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 7 shows an illustrative computer architecture for a computer 700 that can be utilized as a host computer 100 in the implementations described herein. The illustrative computer architecture shown in FIG. 7 includes a baseboard, or "motherboard", which is a printed circuit board to which a multitude of components or devices can be connected by way of a system bus or other electrical communication path.

In one illustrative configuration, a central processing unit ("CPU") 702 operates in conjunction with a Platform Controller Hub ("PCH") 706. The CPU 702 is a central processor that performs arithmetic and logical operations necessary for the operation of the computer 700. The computer 700 can include a multitude of CPUs 702. Each CPU 702 might include multiple processing cores.

The CPU 702 provides an interface to a random access memory ("RAM") used as the main memory 724 in the computer 700 and, possibly, to an on-board graphics adapter 710. The PCH 706 provides an interface between the CPU 702 and the remainder of the computer 700.

The PCH 606 can also be responsible for controlling many of the input/output functions of the computer 700. In particular, the PCH 706 can provide one or more universal serial bus ("USB") ports 712, an audio codec 722, a Gigabit Ethernet Controller 732, and one or more general purpose input/output ("GPIO") pins 714. The USB ports 712 can include USB 2.0 ports, USB 3.0 ports and USB 3.1 ports among other USB ports. The audio codec 722 can include Intel High Definition Audio, Audio Codec '97 ("AC'97") and Dolby TrueHD among others.

The PCH 706 can also include functionality for providing networking functionality through a Gigabit Ethernet Controller 730. The Gigabit Ethernet Controller 730 is capable of connecting the computer 700 to another computer via a network. Connections which can be made by the Gigabit Ethernet Controller 730 can include LAN or WAN connections. LAN and WAN networking environments are commonplace in offices, enterprise-wide computer networks, intranets, and the Internet.

The PCH 706 can also provide a bus for interfacing peripheral card devices such as a graphics adapter 732. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 706 can also provide a system management bus 734 for use in managing the various components of the computer 700. Additional details regarding the operation of the system management bus 734 and its connected components are provided below. Power management circuitry 726 and clock generation circuitry 728 can also be utilized during the operation of the PCH 706.

The PCH 706 is also configured to provide one or more interfaces for connecting mass storage devices to the computer 700. For instance, according to one configuration, the PCH 706 includes a serial advanced technology attachment ("SATA") adapter for providing one or more serial ATA ports 716. The serial ATA ports 716 can be connected to one or more mass storage devices storing an OS, such as OS 602 and application programs 720, such as a SATA disk drive 718. As known to those skilled in the art, an OS 602 comprises a set of programs that control operations of a computer and allocation of resources. An application program is software that runs on top of the operating system 602, or other runtime environment, and uses computer resources to perform application specific tasks desired by the user.

According to one configuration, the OS 602 comprises the LINUX operating system. According to another configuration, the OS 602 comprises the WINDOWS operating system from MICROSOFT CORPORATION. According to another configuration, the OS 602 comprises the UNIX operating system or one of its variants. It should be appreciated that other operating systems can also be utilized.

The mass storage devices connected to the PCH 706, and their associated computer-readable storage media, provide non-volatile storage for the computer 700. Although the description of computer-readable storage media contained herein refers to a mass storage device, such as a hard disk or CD-ROM drive, it should be appreciated by those skilled in the art that computer-readable storage media can be any available media that can be accessed by the computer 700.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 700.

A low pin count ("LPC") interface can also be provided by the PCH 706 for connecting a Super I/O device 708. The Super I/O device 708 is responsible for providing a number of input/output ports, including a keyboard port, a mouse port, a serial interface, a parallel port, and other types of input/output ports.

It should be appreciated that the program modules disclosed herein can include software instructions that, when loaded into the CPU 702 and executed, transform a general-purpose computer 700 into a special-purpose computer 700 customized to facilitate all, or part of, the operations disclosed herein. As detailed throughout this description, the program modules can provide various tools or techniques by which the computer 700 can participate within the overall systems or operating environments using the components, logic flows, and/or data structures discussed herein.

The CPU 702 can be constructed from any number of transistors or other circuit elements, which can individually or collectively assume any number of states. More specifically, the CPU 702 can operate as a state machine or finite-state machine. Such a machine can be transformed to a second machine, or a specific machine, by loading executable instructions contained within the program modules. These computer-executable instructions can transform the CPU 702 by specifying how the CPU 702 transitions between states, thereby transforming the transistors or other circuit elements constituting the CPU 702 from a first machine to a second machine, wherein the second machine can be specifically configured to perform the operations disclosed herein. The states of either machine can also be transformed by receiving input from one or more user input devices, network interfaces (such as the Gigabit Ethernet Controller 730), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to the technology used to implement the storage media, whether the storage media are characterized as primary or secondary storage, and the like. For example, if the storage media are implemented as semiconductor-based memory, the program modules can transform the physical state of the semiconductor main memory and/or NVRAM. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 706 can include a system management bus 734. As discussed above, when utilized to implement the host computer 100, the system management bus 114 can include a BMC SOC 102. As discussed above, the BMC SOC 102 is a microcontroller includes functionality for monitoring aspects of the operation of the computer 700. In the more specific configuration shown in FIG. 1 and described above, the management processor 128 of the BMC SOC 102 monitors health-related aspects associated with the computer 700, such as, but not limited to, the temperature of one or more components of the computer 700, speed of rotational components (e.g., spindle motor, CPU fan, etc.) within the computer 700, the voltage across or applied to one or more components within the computer 700, and the available and/or used capacity of memory devices within the computer 700. To accomplish these monitoring functions, the management processor 128 of the BMC SOC 102 is communicatively connected to one or more components by way of the system management bus 114 in some configurations.

In one configuration, these components include sensor devices 738 for measuring various operating and performance-related parameters within the computer 700. The sensor devices 738 can be either hardware or software based components configured or programmed to measure or detect one or more of the various operating and performance-related parameters.

The management processor 128 of the BMC SOC 102 functions as the master on the system management bus 114 in most circumstances, but can also function as either a master or a slave in other circumstances. Each of the various components communicatively connected to the management processor 128 of the BMC SOC 102 by way of the system management bus 114 is addressed using a slave address. The system management bus 114 is used by the management processor 128 of the BMC SOC 102 to request and/or receive various operating and performance-related parameters from one or more components that are also communicatively connected to the system management bus 114.

In another embodiment, the NVRAM 742 containing the firmware 142 is connected directly to the PCH 706 and switched between the PCH 706 and BMC 102 through the usage of a MUX. In this embodiment, the BMC can execute only initial verification code and not perform runtime monitoring of accesses by the PCH 706 to SPI memory devices.

It should be appreciated that the functionality provided by the computer 700 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 700 might not include all the components shown in FIG. 7, can include other components that are not explicitly shown in FIG. 7, or might utilize an architecture completely different than that shown in FIG. 7.

Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A baseboard management controller (BMC) system on chip (SOC), comprising:
   a memory storing an immutable public key;
   a first processor providing a secure environment; and
   a second processor providing a normal environment, wherein
   upon powering on the first processor, the first processor is configured to
   attempt to cryptographically verify a firmware for the BMC SOC using the public key, the firmware for the BMC SOC comprising a security subsystem and a management subsystem, the security subsystem configured to provide a hardware root of trust (HRoT) based upon the public key and the management subsystem configured to provide BMC functionality,
   responsive to cryptographically verifying the firmware for the BMC SOC, begin executing the security subsystem on the first processor in the secure environment and causing the second processor to exit from reset and begin executing the management subsystem in the normal environment,
   attempt to cryptographically verify a firmware for a host computer by way of the security subsystem, and
   responsive to cryptographically verifying the firmware for the host computer, cause a host processor of the host computer to exit from reset and begin executing the firmware for the host computer.

2. The BMC SOC of claim 1, wherein the first processor is further configured to recover the firmware for the BMC SOC responsive to determining that the firmware for the BMC SOC could not be cryptographically verified.

3. The BMC SOC of claim 1, wherein the first processor is further configured to recover the firmware for the host computer responsive to determining that the firmware for the host computer could not be cryptographically verified.

4. The BMC SOC of claim 1, further comprising a plurality of buses, wherein the plurality of buses is assigned to the secure environment.

5. The BMC SOC of claim 1, wherein a plurality of controllers of the host computer are assigned to the secure environment.

6. The BMC SOC of claim 1, wherein a memory storing the firmware for the BMC SOC and a memory storing the firmware for the host computer are assigned to the secure environment.

7. The BMC SOC of claim 4, wherein the second processor providing the normal environment can access the memory storing the firmware for the BMC SOC and the memory storing the firmware for the host computer only by making requests to the first processor providing the secure environment.

8. A computer-implemented method, comprising:
   upon powering on of a first processor of a baseboard management controller (BMC) system on chip (SOC), attempting to cryptographically verify a firmware for the BMC SOC by way of the first processor using an immutable public key stored in the BMC SOC, the firmware for the BMC SOC comprising a security subsystem and a management subsystem, the security subsystem configured to provide a hardware root of trust (HRoT) based upon the public key and the management subsystem configured to provide BMC functionality; and responsive to cryptographically verifying the firmware for the BMC SOC, begin executing the security subsystem on the first processor in a secure environment and causing a second processor of the BMC SOC to exit from reset and begin executing the management subsystem in a normal environment.

9. The computer-implemented method of claim 8, further comprising:
attempting to cryptographically verify a firmware for a host computer by way of the security subsystem executing in the secure environment on the first processor; and
responsive to cryptographically verifying the firmware for the host computer, cause a host processor of the host computer to exit from reset and begin executing the firmware for the host computer.

10. The computer-implemented method of claim 8, further comprising recovering the firmware for the BMC SOC responsive to determining that the firmware for the BMC SOC could not be cryptographically verified.

11. The computer-implemented method of claim 9, further comprising recovering the firmware for the host computer responsive to determining that the firmware for the host computer could not be cryptographically verified.

12. The computer-implemented method of claim 8, wherein a plurality of buses is assigned to the secure environment.

13. The computer-implemented method of claim 8, wherein a plurality of controllers is assigned to the secure environment.

14. The computer-implemented method of claim 8, wherein a memory storing the firmware for the BMC SOC and a memory storing the firmware for the host computer are assigned to the secure environment.

15. The computer-implemented method of claim 14, wherein the second processor can access the memory storing the firmware for the BMC SOC and the memory storing the firmware for the host computer only by making requests to the first processor.

16. A computing system, comprising:
a host processor;
a memory storing a firmware for the computing system;
a memory storing a firmware for a baseboard management controller (BMC) system on chip (SOC), the firmware for the BMC SOC comprising a security subsystem and a management subsystem, the security subsystem configured to provide a hardware root of trust (HRoT) and the management subsystem configured to provide BMC functionality; and
the BMC SOC, the BMC SOC comprising:
a memory storing an immutable public key;
a first processor providing a secure environment; and
a second processor providing a normal environment, wherein
upon powering on the first processor, the first processor is configured to
attempt to cryptographically verify the firmware for the BMC SOC using the public key,
responsive to cryptographically verifying the firmware for the BMC SOC, begin executing the security subsystem on the first processor in the secure environment and cause the second processor to exit from reset and begin executing the management subsystem,
attempt to cryptographically verify the firmware for the computing system by way of the security subsystem, and
responsive to cryptographically verifying the firmware for the computing system, cause the host processor of the computing system to exit from reset and begin executing the firmware for the computing system.

17. The computing system of claim 16, wherein the first processor is further configured to recover the firmware for the BMC SOC responsive to determining that the firmware for the BMC SOC could not be cryptographically verified.

18. The computing system of claim 16, wherein the first processor is further configured to recover the firmware for the computing system responsive to determining that the firmware for the computing system could not be cryptographically verified.

19. The computing system of claim 16, further comprising a plurality of buses and a plurality of controllers, and wherein the plurality of buses and the plurality of controllers are assigned to the secure environment.

20. The computing system of claim 16, wherein the memory storing the firmware for the BMC SOC and the memory storing the firmware for the computing system are assigned to the secure environment and wherein the second processor can access the memory storing the firmware for the BMC SOC and the memory storing the firmware for the computing system only by making requests to the first processor.

* * * * *